United States Patent [19]

Schmidt et al.

[11] 4,182,673

[45] Jan. 8, 1980

[54] DUST PRECUTTER AND METHOD

[75] Inventors: Eric W. Schmidt, Columbus; Lawrence W. Miga, Circleville; James A. Gieseke, Columbus, all of Ohio

[73] Assignee: The United States of America as represented by the Secretary of Agriculture, Washington, D.C.

[21] Appl. No.: 938,593

[22] Filed: Aug. 31, 1978

[51] Int. Cl.[2] .............................................. B07B 13/11

[52] U.S. Cl. .......................................... 209/45; 55/354

[58] Field of Search .................................... 209/45–47, 209/49, 12, 24–25, 135, 156, 143, 145, 154, 158, 470, 502; 55/351, 354; 210/65, 400; 73/28

[56] References Cited

U.S. PATENT DOCUMENTS

| | | | |
|---|---|---|---|
| 818,118 | 4/1906 | Prine | 209/47 |
| 2,468,472 | 4/1949 | Townsend | 209/49 |
| 3,368,333 | 2/1968 | Merklin | 55/354 |

OTHER PUBLICATIONS

Ranz, W. E. et al., "Jet Impactors for Determining the Particle-Size Distribution of Aerosols", AMA Arch. Indus. Hyg. and Occ. Med. 5, May 1952, 465–477.

Stern, S. C. et al., "Collection Efficiency of Jet Impactors at Reduced Pressures," I & EC Fundamentals, vol. 1, No. 4, Nov. 1962, 273–277.

Ranz, W. E. et al., "Impaction of Dust and Smoke Particles," Ind. Eng. Chem., 44, (1952), 1371–1381.

Lundgren, D., "An Aerosol Sampler for Determination of Particle Concentration as a Function of Size and Time," J. Air Poll. Control Assoc., 17, No. 4, Apr. 1967, 225–229.

May, K., "A Cascade Impactor with Moving Slides", AMA Arch. Indus. Health, 13, May 1956, 481–488.

Abstract: Schmidt, E., "A Technique for Size Discrimination of Cotton Dust," Hand-Out to Attendees of 7th Aerosol Technology Meeting, Chicago, Ill., Oct. 11, 1974.

*Primary Examiner*—Robert Halper
*Assistant Examiner*—Jon E. Hokanson
*Attorney, Agent, or Firm*—M. Howard Silverstein; David G. McConnell; Raymond C. Von Bodungen

[57] ABSTRACT

A selective and effective collection of noninhalable and/or nonrespirable particulates employs inertial impaction to separate particles larger than a specified size from smaller particulates in an airstream and to collect them on a moving adhesive collection surface. A unique U-type impaction configuration is used.

5 Claims, 3 Drawing Figures

DUST PRECUTTER AND METHOD

DISCLOSURE OF INVENTION (1) Field of the Invention

The instant invention relates to the utilization of inertial forces to discriminately remove particles larger than a preselected size from a particle laden airstream and to collect and retain said particles.

(2) Description of the Prior Art

It is often highly desirable to remove large particles before sampling in order to investigate the characteristics of the smaller inhalable or respirable particulates. For example, the nature of cotton dust makes it highly desirable to remove large particles and lint before sampling in order to investigate the characteristics of smaller inhalable particulates (e.g. <15–17 μm aerodynamic diameter). Currently, vertical-elutriators are commonly used to perform this precutting task. Their capability to handlle only limited volumetric flows often requires the use of two or three elutriators in parallel for even the simplest sampling operations. The requirement of careful positioning also makes them inconvenient to use and hard to adapt to in-duct sampling. Furthermore, the vertical elutriators tend to be bulky and thus not very portable, thus giving rise to the present invention which includes collecting and removing airborne particles by inertial impaction. The fundamental principle involved in the collection of airborne particles by the inertial impaction mechanism has been extensively studied and is presented by Ranz and Wong, "Jet Impactors for Determining the Particle-Size Distribution of Aerosols," AMA Arch. Indus. Hyg. and Occup. Med. 5:464, May 1952. and Fuchs, "The Mechanics of Aerosols," Pergamon Press (1964). This principle has been used frequently in the design of size-discriminating cascade impactors and precutters designed for specific tasks.

Previous investigators have shown that the collection efficiency of an impaction mechanism is a function of a non-dimensional inertial impaction parameter, Ψ, defined as:

$$\Psi = C\rho_p V D_p^2 / 18\mu D_j$$

where $D_j$ = aerosol jet diameter $V$ = velocity of aerosol jet $D_p$ = particle diameter $\rho_p$ = the particle density $\mu$ = the fluid viscosity $C$ = the Cunningham correction factor given by Millikan, R. A., Phys. Rev. 22, 1 (1923).:

$$C = 1 + (2\lambda/D_p)\,[1.23 + 0.41\, e^{(-0.44 D_p/\lambda)}]$$

and $\lambda$ = the mean free path in the fluid.

Physically, Ψ is the ratio of the stopping distance to a characteristic jet dimension, $D_j$, for a particle of diameter $D_p$, in a fluid with relative velocity, V.

Inertial impaction parameters have been determined empirically for both rectangular and circular jets by Stern, S. C., Zeller, H. W., and Schekman, A. I., "I and EC Fundamentals," Vol. 1, No. 4, November, 1962, and Ranz, W. E., Wong, J. B., Ind. Eng. Chem. 44, 1371 (1952). These parameters can be used to determine a particular jet diameter needed to obtain a desired particle cutoff diameter. For the circular case, the design parameter ($\Psi^{\frac{1}{2}}$) at which 50 percent collection is achieved is 0.375. For a rectangular jet, the value is 0.571. These parameters are based on a uniform flow over all sides of an impaction surface such as the configuration found in a cascade impactor.

SUMMARY AND OBJECTS OF THE INVENTION

In general, the precutter of the instant invention is an apparatus for discriminately removing particles larger than a preselected given size from a moving particle-laden fluid stream, which device comprises in combination the following: (1) a moving collector means including a collecting surface thereon adapted to collect and retain particles impinged thereon; (2) an inlet means is provided for the entrance of the moving fluid stream and includes a jet orifice opening mounted in the inlet means. This jet orifice opening is adapted to direct the moving particle-laden fluid stream therethrough and direct it predominantly perpendicularly toward the collecting surface of the moving collector means. The jet orifice opening is spaced from the collecting surface at a distance optimizing discriminate impingement through inertial force on the collecting surface of the particles larger than the preselected given size. (3) An outlet means is provided for exit of the moving fluid stream with the outlet located upward or downward, as desired, from a moving surface thereby of said collector means and adapted for the moving fluid stream to exit therethrough substantially perpendicular to said collecting surface.

Being small and lightweight, many of the practical problems of position and portability associated with traditional precutters, such as the verticle elutriator, are eliminated. By employing a unique inertial impaction configuration, the subject invention accomplishes a more precise size discrimination "cut" than the most commonly used precutting cyclones. The invented device is simple and requires very little power for operation. Additionally, by employing a moving surface, one avoids the often encountered problem of limited dust loading.

It is the principle object of the invention to separate particles larger than a given size from the corresponding smaller particulates in an airstream.

It is another object of the invention to remove particles larger than a given size from an airstream by means of inertial impaction on a clean surface, which is continually renewed.

It is another object of the invention to employ mechanically simple equipment and yet achieve a precise size discriminating particle cut.

It is yet another object to provide a versatile precutter which is capable of using replaceable inserts to change inlet orifice dimension to vary, as desired, the given particle cut size discriminately removed and collected and thus make the invention applicable to a variety of uses including field sampling and personal sampler usage.

DESCRIPTION OF THE PREFERRED EMBODIMENTS

The nature of cotton dust makes it highly desirable to remove large particles and lint before sampling in order to investigate the characteristics of the smaller inhalable particulates (those $<15$–$17$ μm aerodynamic diameter).

Currently vertical-elutriators are commonly used to perform this precutting task. Their capability to handle only limited volumetric flow often requires the use of 2 or 3 elutriators in parallel for even the simplest sampling operations. The requirement of careful positioning also makes them inconvenient to use and hard to adapt to in-duct sampling. Furthermore, the vertical elutriators tend to be bulky and thus not very portable.

Figure 1:
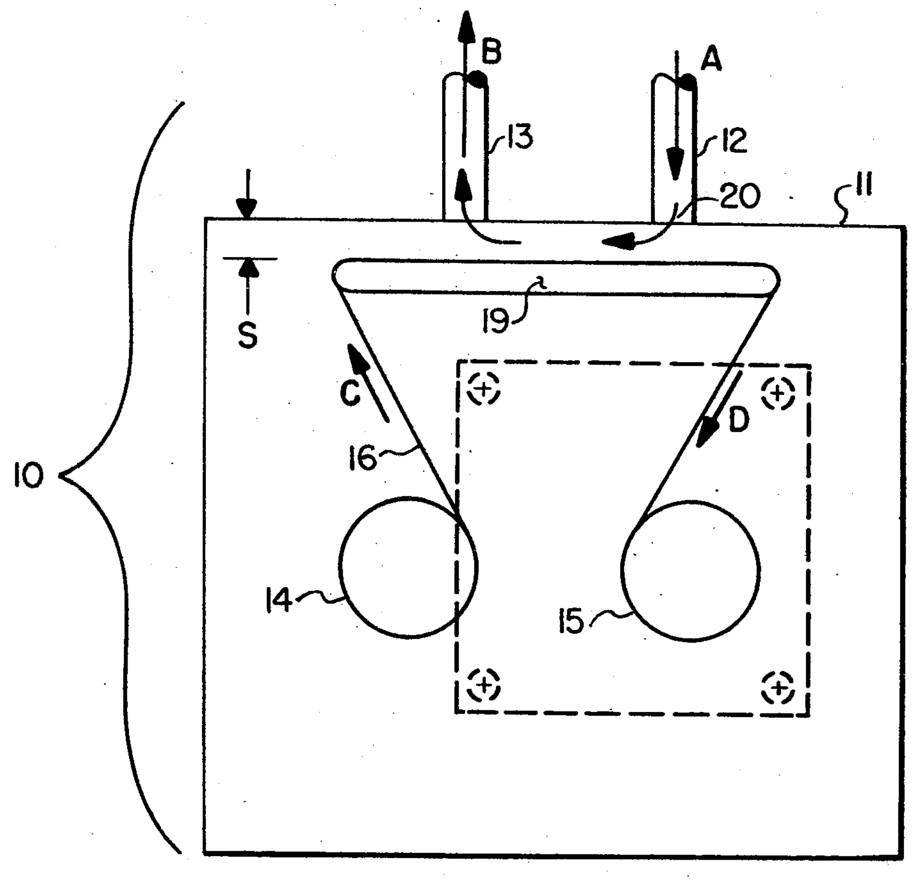
FIG. 1 is a schematic-like frontal cross-sectional view of a dust precutter of the invention and includes arrows showing directional movement of the moving particle-laden fluid and the collection means.
Figure 2:
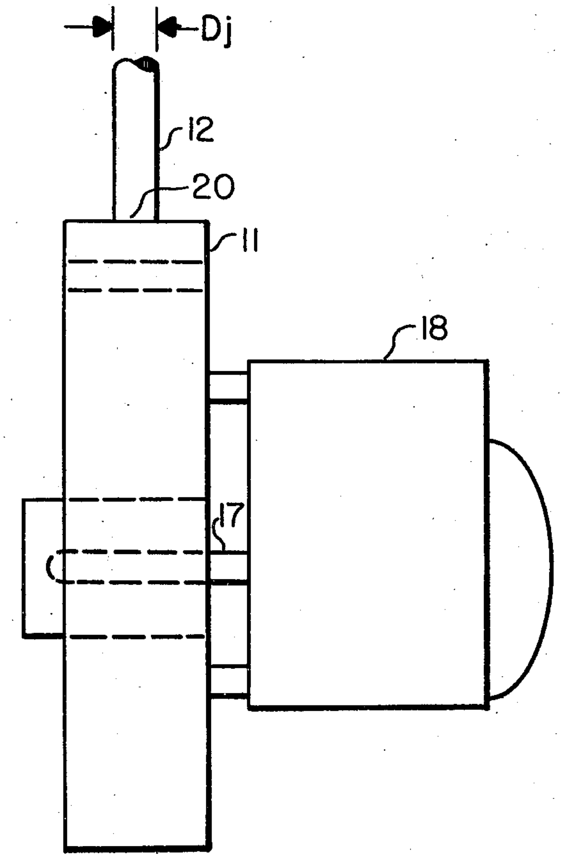
FIG. 2 is a schematic-like side view of the precutter of FIG. 1.

With reference to the drawing FIGS. 1 and 2, an illustrative dust precutter 10 of the invention includes a housing 11 ordinarily composed of plastic or metal sides, top and bottom, one or more of which is detachable and removable, although not illustrated, for ready access to the housing's interior. Entering this housing is an inlet means 12, such as a tube, and an exit means 13, such as another tube, through which a particle-laden fluid stream, such as air containing cotton lint and dust, is passed into and out of housing 11 in the direction of A to B. Within the housing 11 is a feed spool or drum 14 and a takeup spool or drum 15 for a moving collector means 16, which as it moves, passes by both the inlet means 12 and outlet means 13. In the illustrated preferred embodiment, the moving collector means 16 moves countercurrently to the flow of particle-laden fluid in the direction of C to D. Alternatively, the feed and takeup drums, 14 and 15, can be interchanged with the dust precutter being useful upon the moving collector means moving in the same direction as the moving dust-laden fluid. Takeup drum 15 is mounted on a shaft 17 which extends through housing 11 and is driven by a suitable power means, such as electric motor 18. Generally, the moving collector means 16 is an elongated sheet, strip, or tape-like material, e.g. adhesive-surfaced cellophane tape, which in a prewound condition is unwound from feed drum 14 and then wound up on the takeup drum 15 as shaft 17 is turned by motor 18. As collector means 16 moves from drum 14 to drum 15, the collector means 16 passes over a surface support 19 which is mounted in housing 11 in such a manner as to present a collecting surface positioned perpendicular to each of inlet means 12 and outlet means 13 to exit the moving fluid stream. Not apparent from the schematic-like illustrated drawing figures, but included in the collector means 16 is this collecting surface (not designated by numeral), e.g. adhesive layer of tape, receptive to and adapted to collect and retain particles impinging thereon. In the illustrated dust precutter, this collecting surface faces both the inlet means 12 and outlet means 13 as it moves by each. At the location of inlet means 12 into housing 11 is positioned a jet orifice opening 20 adapted to direct the entering particle-laden fluid predominantly perpendicularly to the moving collecting surface of collector means 16. Conventional means, not illustrated, can be provided so that jet orifice opening 20 can be replaced by other jet orifice openings, as desired, of other sizes and other orifice opening configurations. Means, not illustrated, also can be provided so that an employed jet orifice can be positioned flush with or extend farther or less inwardly in housing 11. Likewise, although not illustrated, surface support 19 can be made adjustable so as to be able to be positionable closer to or farther from inlet means 12 and outlet means 13, as desired.

In operation of the illustrated dust precutter, moving particle-laden fluid enters housing 11 through inlet means 12 and jet orifice opening 20. Large particles in the fluid with requisite inertia traverse a distance S (from orifice 20 to surface 19) and impinge onto and collect on the collecting surface of collector means 16. Small particles, which are of a size smaller than the preselected given larger size being collected and/or removed, are without enough inertia to travel distance S and to reach moving collector means 16 and these small particles remain fluid-borne and exit through outlet means 13. The large collected particles on the collecting surface travel from their impact contact area on the collector means 16 and are wound on the takeup drum 15 along with the wound collector means 16. Although not illustrated, as desired or as requisite, movement of the particle-laden fluid into, through, and from the dust precutter can be provided if needed, by means such as a pump downstream or upstream from the inlet and/or outlet means, 12 and 13, for moving the particle-laden fluid.

In a more particularly described and in a preferred embodiment, the invention's precutter is as just described and is one wherein: the collecting surface includes a moving sheet or tape-like material having an adhered adhesive thereon facing said jet orifice opening; the jet orifice opening is a circular orifice opening of a diameter providing a ratio of about 0.6 of said diameter to the distance between said orifice opening and said adhered adhesive; and said moving particle-laden fluid stream flows countercurrently to the moving collector means and upon entrance is a gaseous stream laden with a diversity of small through large sizes of solid particles.

In general, in the method of the invention, one discriminately removes particles larger than a preselected given size from a moving particle-laden fluid stream by the steps of:

(a) directing the moving particle-laden stream from an orifice in a substantially perpendicular direction towards a moving collector surface facing the orifice and adapted to collect and retain particles impinging thereon;

(b) moving the collector surface past the direction of substantial perpendicular movement thereto of the particle-laden fluid stream with the moving collector surface spaced from the orifice at a distance optimizing through inertial force a discriminate impingement of said particles larger than the preselected given size onto the moving collector surface;

(c) flowing a remainder of the moving particle-laden fluid stream along and substantially parallel to the moving collector surface; and (d) thereafter flowing the remainder of the moving particle-laden fluid stream substantially perpendicular to the moving collector surface and away therefrom.

A prototype sampler for demonstrating validity of the subject invention was devised and is a highly portable (6″×5″×4″) Plexiglas-housed device. The collection mechanism is inertial impaction from the volumetric flow induced by a downstream sampling device or vacuum pump. This presampler can operate in any position independent of gravity and is highly suitable for in-duct sampling. Although the invention's precutter, through adjustment of the inlet jet orifice diameter 20, is amenable to use ahead of most available samplers operating at various sampling flow rates, the prototype precutter was designed to operate in conjunction with a proprietary impactor (12.5 l/min) or a Dynac sampler (2.5 l/min.) At these flow rates it has been demonstrated experimentally that the prototype precutter device can handle dust loadings of at least 0.52 $\mu$g/cc.

In addition to being suitable and desirable as a precutter for dust sampling, this prototype is also adaptable by scaling to appropriate size for use as a precutter on small personal respirable dust monitor samplers used in industry.

The invention includes two major unique features in combination of: (1) a special geometric configuration used to induce inertial collection; and (2) a continually moving collection surface.

A U-type impaction geometry serves to meet a design criteria of compactness, convenience in sampling situations, and compatability with a renewable collection surface. With the specific type of flow pattern shown in FIG. 1, the dust laden air enters at one tube 12 and exists through the second tube 13 with the larger particles impacting on the renewable collection surface of 16 in the interim.

Size and opening configuration of the jet orifice 20 for introducing the dust-laden air are most important design parameters. When related to a certain flow rate, the orifice size, e.g. diameter, determines the particles' velocity which in turn determines the particles' inertia and tendency to impact. By varying the jet orifice, e.g. diameter, with a constant air sampling flow rate, different flow characteristics are created which establish a new cutoff particle size for the precutter. Likewise, by changing the distance S, that is, by repositioning the jet orifice and/or the surface for the moving collector means, one can vary distance S therebetween and alter the characteristic performance curve for the precutter. Changing of the jet orifice opening configuration also enables one to establish a new particle size cutoff, and also generally requires an empirical determination of optimum spacing distances from orifice to collecting surface.

Figure 3:
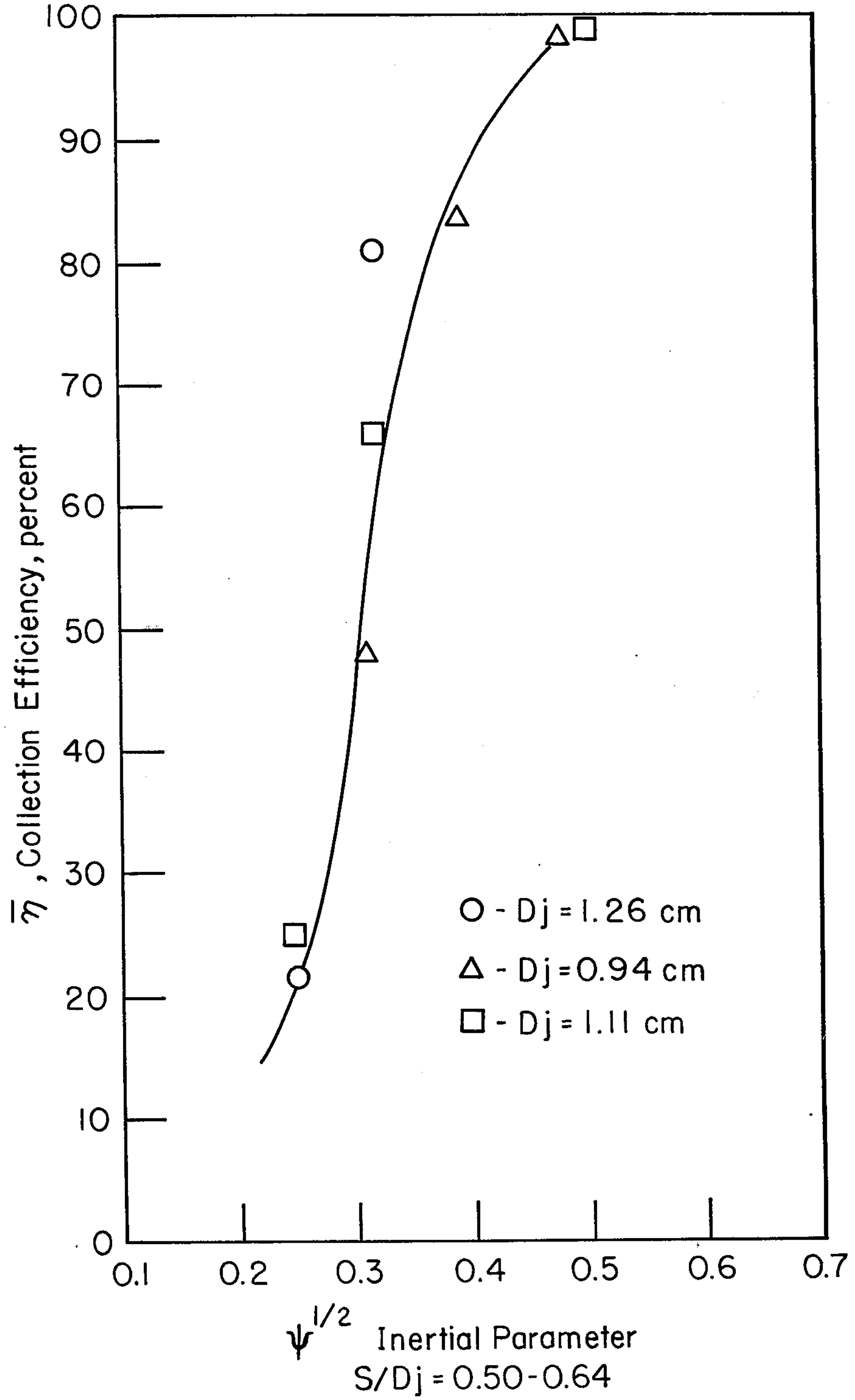
FIG. 3 is an experimental curve demonstrating precision of the precutters's performance.

For the U-type geometry employed, it has been experimentally determined that the inertial design parameter, $\Psi$, for 50 percent collection efficiency is 0.31. It has also been empirically determined that another important parameter, the ratio of the spacing (the distance between the inlet and collecting surface) to the jet diameter, should be 0.6 for the sharpest cutoff. FIG. 3 shows the performance curve for this precutter design. A ratio of 0.6 is preferred.

An especially useful feature of the precutter is that the collection surface is renewable. Particles are continuously collected and removed, such as by a sticky tape surface, in order to prevent reentrainment and allow for large dust loadings. Tape 16 is mounted on spools driven by a 1-rpm electric motor, and moves along collecting surface 19. The prototype presampler was designed to use ¾-inch Scotch®tape and to operate unattended for more than 5 hours; however, other sticky or moist surfaced tapes or films can be used and the sampling time will be controlled by the length of tape inserted on the feed roll. The unit is sealed during operation but can be opened easily for loading fresh tape.

Although as just described, the invention is particularly useful upon employing a particle-laden fluid stream in which by example the particles are of a solid material, such as cotton lint and dust, and the fluid is a gaseous material, such as air, it is contemplated that the invention will be useful with other particle-laden fluid streams in which the particles are of different solid materials and/or the fluid is of a different gaseous material or is air. Likewise, it is contemplated that with little-to-minor modification thereof, such as requisite modification of collecting surface 19 depending on the nature of the particles and their type so as to collect and retain them upon impingement thereon, the invention also may be useful for discriminately removing particles larger than a given size from particle-laden fluid streams, such as liquid droplets in a gas stream, solid particles in a liquid stream, etc. Accordingly, the invention is to be understood to be limited only to its true scope as set forth in the appended claims. Precision of the precutter's performance is demonstrated by the experimental curve shown in FIG. 3.

A brief description of the design procedures and an example are needed to clarify how the described precutter method is related to a workable instrument. Stated simply, the precutter is designed by calculating the most critical dimension, aerosol jet diameter, $D_j$, from the inertial parameter, $\Psi$, using the prescribed experimental conditions (such as volumetric flow rate) and the desired cutoff diameter, $D_p$. Knowing $D_j$, the other critical dimension, spacing between the aerosol inlet and the impaction surface, S, may be calculated using the empirically determined ratio. A specific design example follows.

EXAMPLE

It is desired to design a precutter to remove particles of unit density larger than 15 $\mu$m diameter from a stream prior to entering an instrument requiring a flow of 12.5 l/min of air at standard conditions.

From the statement of the task, it follows that $D_p = 15\ \mu m\ (15\times 10^{-4}\ cm) \equiv$ cutoff diameter $Q = 12.5$ l/min (208 $cm^3$/sec) STP $\equiv$ volumetric flow rate $\rho_p = 1\ g/cm^3 \equiv$ particle density, and $\mu = 1.8\times 10^{-4}$ g/cm-sec $\equiv$ viscosity of air at STP.

As stated, the paramount parameter, $\psi$, must be employed to obtain the most critical design dimension, aerosol jet diameter $D_j$:

$$\psi = C\rho_p V D_p^2 / 18\mu D_j. \quad (1)$$

It follows that $$D_j = C\rho_p V D_p^2 / 18\mu\Psi, \quad (2)$$

where

C $\equiv$ Cunningham correction factor $= 1$, for 15 $\mu$m particle

V $\equiv$ aerosol jet velocity (to be discussed)

$\Psi \equiv$ inertial parameter $= 0.31$, as was determined experimentally for the U-shape impaction configuration.

Furthermore, V may be expressed as the volumetric flow rate, Q, divided by the cross-sectional area of the aerosol jet, $\pi D_j^2/4$, if we assume plug flow, $$V = 4Q/\pi D_j^2. \quad (3)$$

Substituting Equation (3) into Equation (2) yields $$D_j = 4C\rho_p D_p^2\ Q / 18\mu\psi\pi D_j \quad (4)$$

or $$D_j = \sqrt[3]{\frac{2C_p D_p^2 Q}{9\,\mu\pi\psi}} \tag{5}$$

Substituting actual values:

$$D_j(\text{cm}) = \sqrt[3]{\frac{2 \cdot 1 \cdot \text{g/cm}^3 \cdot (15 \times 10^{-4})^2\ \text{cm}^2 \cdot 208\ \text{cm}^3/\text{sec}}{9 \cdot (1.8 \times 10^{-4})\ \text{g/cm} - \text{sec} \cdot \pi \cdot 0.31}} \tag{6}$$

$$D_j = 0.84\ \text{cm} = 0.33\ \text{in.}$$

It was determined empirically that for sharpest cutoff, the ratio of spacing, S, to jet diameter, $D_j$, should be 0.6:

$$S/D_j = 0.6 \tag{7}$$

Thus, $$S = 0.6\ D_j = 0.6 \times 0.84\ \text{cm} = 0.50\ \text{cm} = 0.20\ \text{in.} \tag{8}$$

Properties of the collection surface will be determined by the precutter application. The collection surface should be wider than the jet diameter and move at a speed as dictated by the aerosol concentration. For the example cited, a ¾-inch wide tape was sufficient. A tape speed of approximately 3 inches/minute was adequate to handle aerosol loadings up to 0.52 $\mu g/cm^3$ of cotton dust as determined experimentally.

We claim:

1. A device for discriminately removing particles larger than a preselected given size from a moving particle-laden fluid stream which device comprises in combination: a moving collector means including a collecting surface thereon having means to collect and retain particles impinged thereon; a housing to enclose said moving collector means; an inlet through said housing means for entrance of the moving fluid stream, including a jet orifice opening in said inlet means and adapted to direct said moving particle-laden fluid stream therethrough and predominately perpendicularly toward said collecting surface of said moving collector means with said jet orifice opening spaced from said collecting surface at a distance optimizing discriminate impingement through inertial forces on said collecting surface of said particles larger than said preselected given size; and an outlet means through said housing for moving the fluid stream deleted of said larger particles with said outlet means located downstream of said inlet means on the same side of said collecting means as said inlet and extending substantially perpendicular to said collecting surface.

2. The device of claim 1 wherein: the collecting surface includes a sheet or tape-like material having an adhered adhesive thereon facing said jet orifice; the jet orifice has a circular orifice opening of a diameter providing a ratio of about 0.6 of said diameter to the distance between said orifice opening and said adhered adhesive; and upon passing through said jet orifice, said moving particle-laden fluid stream is a gaseous stream laden with a diversity of small through large sizes of solid particles.

3. A method of discriminately removing particles larger than a preselected given size from a particle-laden fluid stream which method comprises:

(a) directing the moving particle-laden stream from an orifice in a substantially perpendicular direction towards a moving collector surface facing the orifice and adapted to collect and retain particles impinging thereon;

(b) moving the collector surface past the direction of substantial perpendicular movement thereto of the particle-laden fluid stream with the moving collector surface spaced from the orifice at a distance optimizing through inertial force a discriminate impingement of said particles larger than the preselected given size onto the moving collector surface;

(c) flowing a remainder of the moving particle-laden stream along and substantially parallel to the moving collector surface; and (d) thereafter flowing the remainder of the moving particle-laden fluid stream substantially perpendicular and away from the moving collector surface, thereby exiting said remainder of said moving particle-laden fluid stream.

4. The method of claim 3 in which the flowing of the remainder of the moving particle-laden fluid stream is counter-current to the moving collector surface.

5. The method of claim 4 employing a moving collector surface which is the adhesive of a moving adhesive-surfaced tape which adhesive collects and retains the particles larger than the preselected given size, and thereafter which said adhesive-surfaced tape winds onto a powered drum which through its winding moves and takes up said moving adhesive-surfaced tape.

* * * * *